United States Patent [19]
Thomas et al.

[11] Patent Number: 5,234,029
[45] Date of Patent: Aug. 10, 1993

[54] SAFETY LOCKOUT DEVICE FOR UTILITY CONTROL

[75] Inventors: Jeffrey G. Thomas, Northridge; Lucas Brito, Palmdale, both of Calif.

[73] Assignee: Cott Manufacturing Company, Glendale, Calif.

[21] Appl. No.: 916,035

[22] Filed: Jul. 17, 1992

[51] Int. Cl.⁵ .................... F16K 37/00; F16L 5/00
[52] U.S. Cl. ..................... 137/559; 137/364; 137/371; 137/382
[58] Field of Search ............... 137/363, 364, 371, 559, 137/382

[56] References Cited

U.S. PATENT DOCUMENTS

| | | | |
|---|---|---|---|
| 148,102 | 3/1874 | Wiliamson et al. | 137/371 |
| 154,408 | 8/1874 | McKnight | 137/371 |
| 969,776 | 9/1910 | Foley | 137/371 |
| 1,458,391 | 6/1923 | Burton | 137/371 |
| 1,610,123 | 12/1926 | Fairweather | 137/371 |
| 3,921,449 | 11/1975 | Hawffe et al. | 137/371 |

*Primary Examiner*—A. Michael Chambers
*Attorney, Agent, or Firm*—Clifford A. Poff

[57] ABSTRACT

The disclosure relates to a safety lockout device for use with a domestic on-off natural gas valve of the type buried underground, sometimes referred to as a curb service valve. In order to prevent the inadvertent and-/or unauthorized operation of the valve once it has been closed, a safety lockout device is provided comprising a U shaped bracket that is inserted into the valve box associated with the valve arranged at ground level above the valve. The bracket is of a dimension that prevents it from inadvertently falling through the valve box opening and has tabs that engage the ring of the valve box, which engagement prevents the bracket from moving relative to the valve box. To prevent removal of the bracket from the valve box a bell is arranged over the inserted bracket having a cover that prevents access to the valve by a tool used to operate the valve. The bell is of a dimension that prevents it from inadvertently falling through the valve box opening. The bracket has an eyebolt that passes through the cover of the bell which allows a padlock to be inserted into the eye, thereby the bell and bracket are protected from unauthorized removal. An indicia cover may be arranged on either the upper surface of the bell or on the outer surface of the cover of the valve box giving notice of the presence of the safety lockout device in the valve box.

13 Claims, 4 Drawing Sheets

SAFETY LOCKOUT DEVICE FOR UTILITY CONTROL

BACKGROUND OF THE INVENTION

The present invention relates to a safety lockout device for use with various types of shut-off control devices, including switches or valves employed in a piping or electrical network to open and close the supply of a utility, such as natural gas, water or electrical service. One application, by way of example and not limitation, would be in urban areas, where a network supply valve is usually buried underground. In such situations, a device commonly referred to as a valve box or curb service box (hereinafter valve box) is employed in conjunction with the utility valve or switch. The box is made up of a vertically extending arrangement of interlocking components extending from ground level above the valve downwardly into a partly enveloping relation with the valve. The valve is constructed with a projecting stem that allows it to be operated by a special tool from above grade. The tool can be inserted through a hollow internal part of the valve box into a mechanically operable relation with the valve located several feet below.

In recent years, both as an industry concern and governmental insistence there has been an increased interest in providing safety lockout devices to prevent the valves from being inadvertently and/or by unauthorized acts opened after they have been closed, incident to an interest to inspect or perform work, etc. on the piping network, the safety reason for which is believed to be self evident.

A need exists for a safety lockout device operable with a diverse variety of shut-off control devices such as, for example, valve boxes and curb service box designs. Such boxes generally have a ring member situated at ground level mechanically combined to a subsurface top section by an interfitting connection. The present invention utilizes this interfitting connection as part of needed support for a safety lockout device.

SUMMARY OF THE PRESENT INVENTION

The present invention has for one of its objects providing in a valve box system a cover for blocking access to a shut-off control device associated with the box in an underground utility supply system. The cover cooperates with a connector having one end selectively secured to the box below the cover and another end extending through the opposite side of the cover, which end is adapted to receive a padlock or the like, the padlock locking the connector to the cover, which in turn is secured to the box so that so long as the padlock is in place the cover will block access to the valve and be prevented from being removed inadvertently or by an unauthorized act.

The present invention has for another object to provide a safety lockout device to prevent inadvertent and/or unauthorized access to an associated shut-off control device, which device will have the features and advantages of being economical to manufacture, simple in construction, durable in repeated use, and quickly and easily inserted into and removed from a valve box or curb service box in a manner when inserted to selectively secure itself to the box, and by a cover block access to the valve, in which before the secured condition can be removed, the locked cover arranged over the box must be removed.

More particularly, the present invention provides a safety lockout device for use with a utility distribution network having an underground shut-off control device accessible at ground level by a valve box with an opening and an outer surface, the device comprising a first means having first and second portions, the first portion extending into and being slightly smaller than the opening of the valve box and having an axial length greater than the diameter of the opening, the second portion having an engagable surface sufficient when engaged to prevent movement of the first means in the direction of the outer surface of the valve box, the first portion being compressible so as to have the tendency to move from an inward position to an outward position, whereby the engagable surface is urged away from the axis of the opening, and caused to assume an extended position greater in distance than the diameter of the opening of the valve box, attachment means secured at its inner end to the first portion and arranged to extend from the first portion to a position adjacent to but below the outer surface of the valve box and having at its outer end a lockable member, second means having a cover element arranged and of a size to block access to the first means, the cover element having an opening arranged and sized to allow said lockable member to pass therethrough, a member carried by and extending away from the cover element into the opening of the valve box and having an axial length greater than the diameter of the opening of the valve box, and the member having means along its axial length formed to pass over the first means when the second means is inserted in a locking position over the first means, the cooperative relationship between the first means and second means being such that with the second portion in its engaged condition, the second means in its locking position and the lockable member in a locked condition, the first means and second means create a safety lockout for the valve.

A still further object of the invention is to provide for a padlock to be secured to the attachment means, the removal of which is necessary to gain access to the valve.

It is another object of the invention to provide in a safety lockout device of the above described type a cover element dimensioned relative to the valve box to form a recess above the cover element in the opening of the valve box, sufficient to allow a cover plate to be placed above the cover element and to be arranged substantially flush with the outer surface of the valve box, the cover plate is dimensioned to fit into the recess and assume the flush relationship, and the cover element or cover plate having an indicia on its outer surface design to give notice of the presence of the safety lockout device in the valve box.

DETAIL DESCRIPTION OF THE INVENTION

Figure 1:
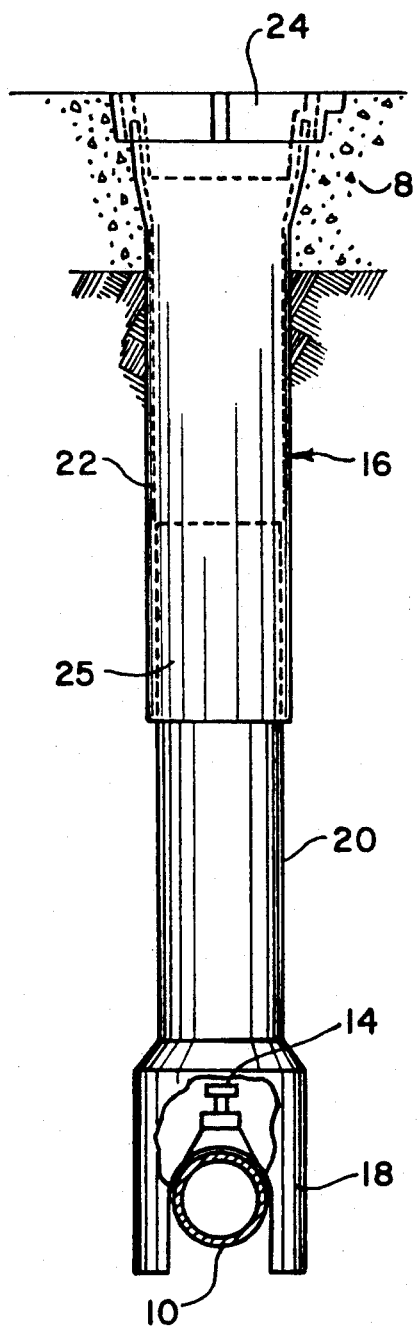
FIG. 1 is an elevational view, partly in section, of an on-off type valve system, illustrating a portion of a piping network with which the present invention may be employed as a retrofit assembly, including at the upper end of the system a typical valve box.
Figure 2:
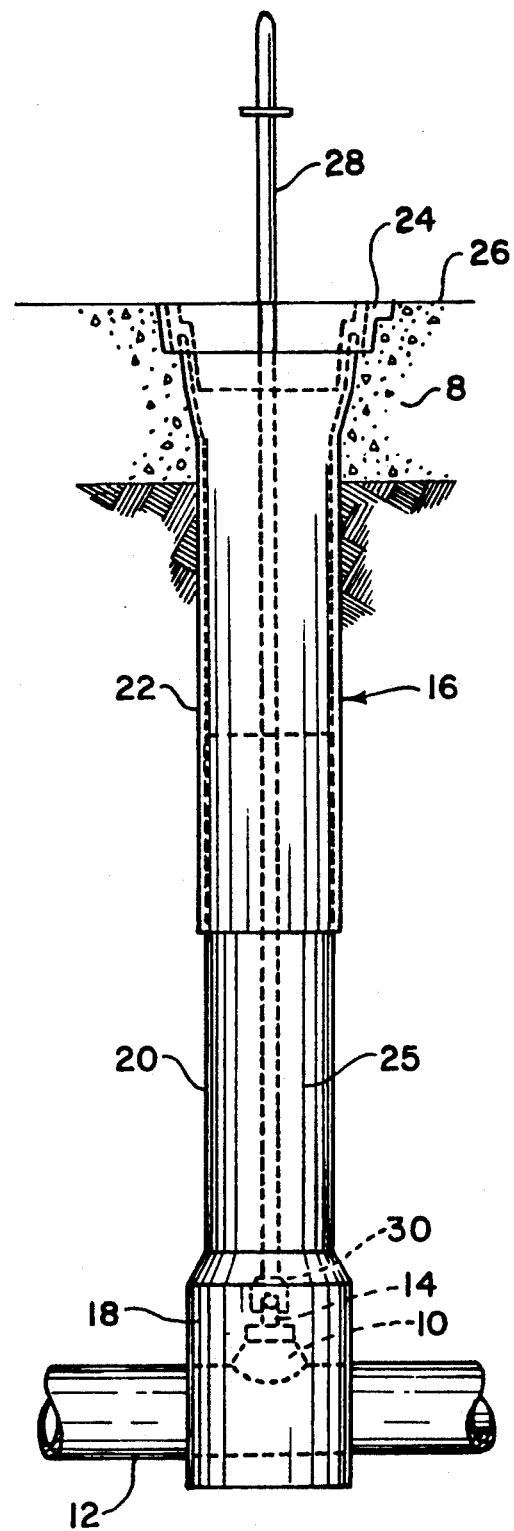
FIG. 2 is a view similar to FIG. 1, but not in partial section, taken at 90° from the position illustrated in FIG. 1, and illustrating a tool in the operative position it assumes to operate the valve.

With reference to FIGS. 1 and 2, there is shown a typical valve system of the type noted above in its usual upright position relative to the ground 8, comprising a valve 10, being mounted in a pipe 12 of a network piping system, the valve 10 having a valve operating stem 14 located at its top. Around and above the valve there is mounted a valve box system 16, for example a curb service type, made up of a base 18, bottom 20, top 22 and ring 24, collectively constituting a valve box, each part being cylindrically formed and interfitting with an adjacent part to make up a complete assembly, with a continuous opening 25, the top 22 being adjustable relative to the bottom 20 to bring the upper surface of the ring 24 to ground level 26, as shown in the Figures.

FIG. 2 also illustrates a typical tool 28, the lower end of which has a stem engaging adaptor 30 shown in engagement with the stem 14, the tool extending considerably above ground level 26, for the convenience of a workman to operate the tool. As indicated above, the curb service valve box system 16 and the shut-off device or valve 10 follow well known designs and represent examples of several well known types, being formed from well known materials for the use and purpose intended, it being appreciated by those skilled in the art that such materials are required to be in conformance with applicable ASTM standards.

Figure 3A:
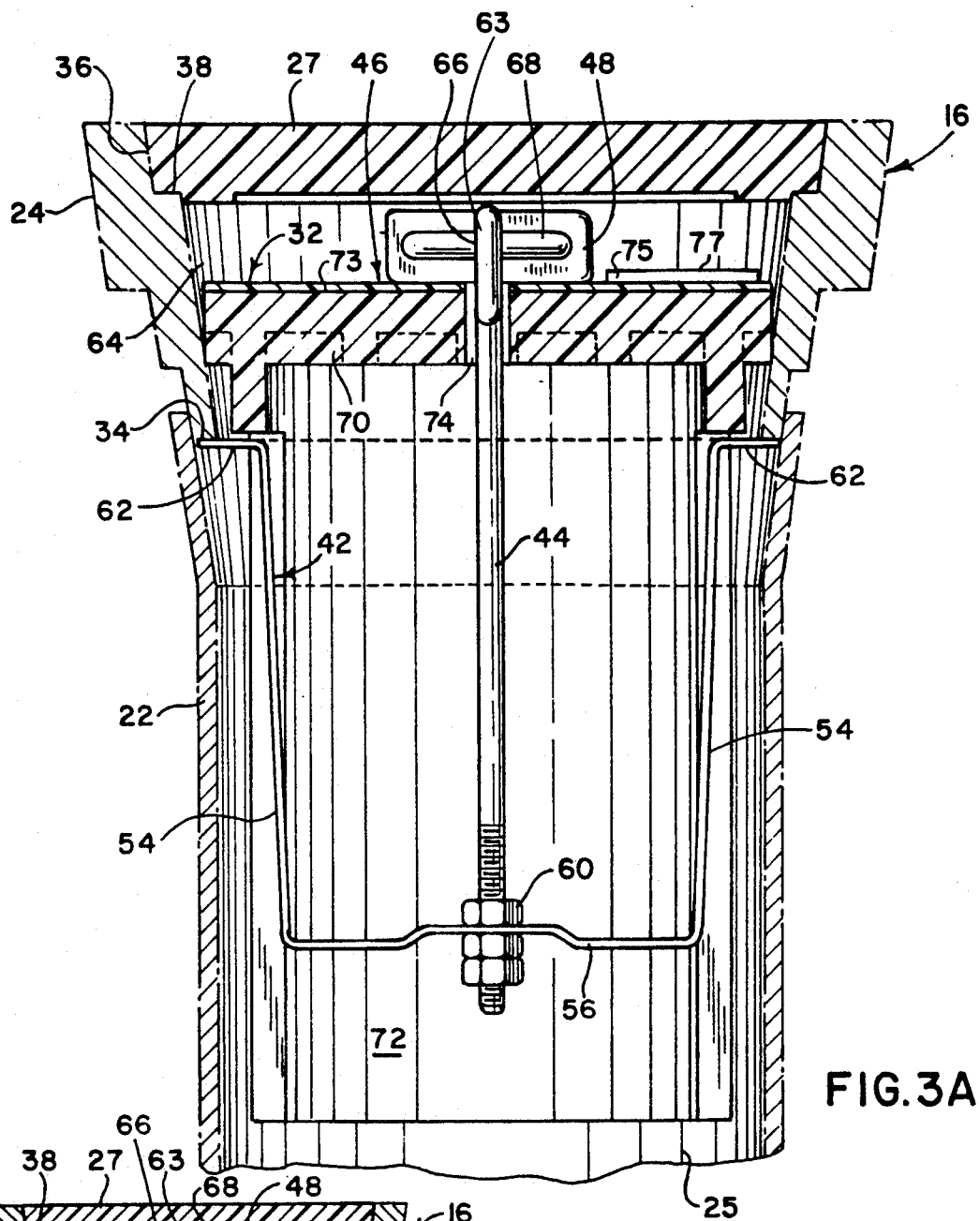
FIG. 3A is a sectional view of the upper portion of the valve system shown in FIGS. 1 and 2, but with a safety lockout device of the present invention illustrated in its lockout position in the valve box.

With reference now to FIG. 3A, the upper most part of the valve box 16 is shown and into the conduit of which a retrofit assembled safety lockout device 32 in accordance with the present invention has been inserted into its operative position. FIG. 3A shows the upper portion of the top 22, the cast iron ring 24, and the cast iron cover 27, in some boxes referred to as a traffic lid, that is originally supplied with the box and designed to fit into the ring below its upper surface. The cover is secured to the ring by a bolt, not shown, that threads into a threaded hole, not shown, in the ring.

In regard to the ring 24, it will be noted in FIG. 3A that at its inner most end it is provided with a cylindrical edge 34 that is located inward of the adjacent upper end of the top 22, the edge having a width slightly greater than the thickness of the top. The ring also at its outer end has a recess 36 having a cylindrical ledge 38 and a certain depth to receive the cover 27, the upper surface of which is flush with ground level.

The device essentially comprises four separate parts or elements, namely a bracket 42, an eyebolt 44, a bell 46, and a padlock 48. In still referring to FIG. 3A, it will be noted that the bracket 42 and bell 46 extend into the interior of the top 22 a distance greater than the diameter of the opening 25 of the valve box 16, the reason for which is to prevent any possibility of the two elements falling into and/or through the opening 25 in the direction of the bottom of the valve box and becoming wedged therein.

Figure 4:
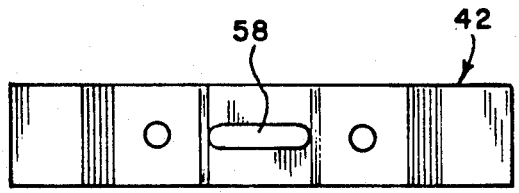
FIG. 4 is a plan view of the bracket that makes up part of the safety lockout device illustrated in FIG. 3, without showing the eyebolt thereof.
Figure 5:
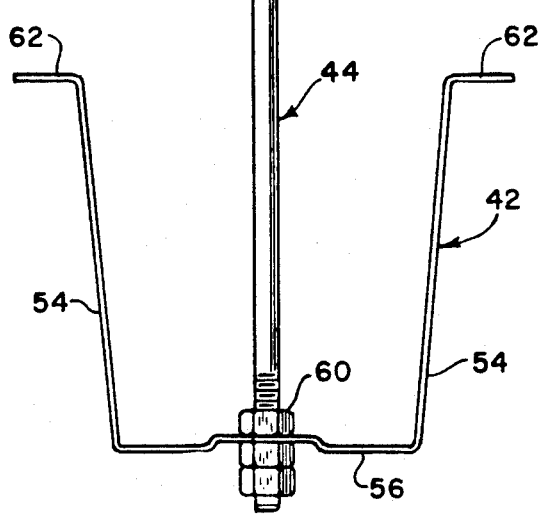
FIG. 5 is an elevational view of the bracket shown in FIG. 4, showing the eyebolt thereof.

FIGS. 4 and 5 serve to better illustrate the details of the bracket 42 and eyebolt 44. The bracket consist of a U shaped flanged element having a relatively narrow width relative to the diameter of the opening 25 of the valve box 16, as best shown in FIG. 4, and as noted, has a vertical length, as viewed in FIG. 5, greater than its transverse dimension. The substantially parallel legs or platform portion 54 of the bracket 42 are joined by a bottom 56, the center area of which has a slot 58 for receiving the lower threaded end of the eyebolt 44, the eyebolt being secured to the bottom 56 by several nuts 60. The flanged or ledge portions of the bracket 42, take the form of opposed tabs 62 arranged at the top of each leg 54 to project generally perpendicularly outwardly from the legs. In referring to FIG. 3A, it will be seen that the tabs 62, along with the legs 54, are dimensioned so that the outer upper areas of the tabs engage the entire surface of the edge 34 of the ring 24. This contact is designed to prevent the upward movement of the bracket 42 as long as the tabs are engaged.

Figure 3B:
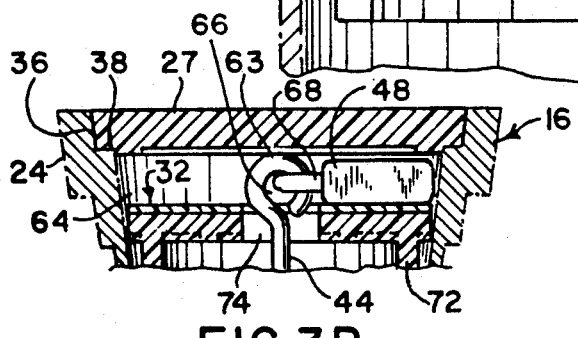
FIG. 3B is a partial sectional view in a smaller scale of the upper portion of FIG. 3A, but with the eyebolt slot and padlock rotated 90°.

The bracket may be made from a well known alloy steel, preferably high carbon spring steel or alloy spring steel, in which the thickness, width and length of the legs and tabs allow, in the first instance, the legs to be collapsed inwardly, towards the axis of the opening 25 of the valve box 16 to allow the bracket with the tabs 62 to be inserted into and through the ring 24 and into the opening, and in a second instance to a position where the tabs are below the edge 34 of the ring 24, as shown in FIG. 3A. Once so installed and with the removal of the collapsing force, the legs 54 will spring outwardly relative to the axis of the opening 25 to place the tabs under the edge 34 of the ring. The compressibility or deflective character is such that the legs will have a "natural" position in which the tabs will be placed under the edge 34 and will inherently resist movement therefrom. If the tabs when installed happen to fall below but out of contact with the edge 34, upward movement of the eyebolt 44 will bring the bracket into the locking condition. It should be noted that the collapsing of the legs 54 is designed to be accomplished by a workman using only one of his hands. The upper end of the eyebolt 44 is provided with an eye formed end 63, and as shown in FIG. 3B is arranged to locate itself in a spaced 64 between the cover 27 and the bell 46 and has an opening 66 sufficient to conveniently receive the engaging part 68 of the padlock 48.

Figure 6:
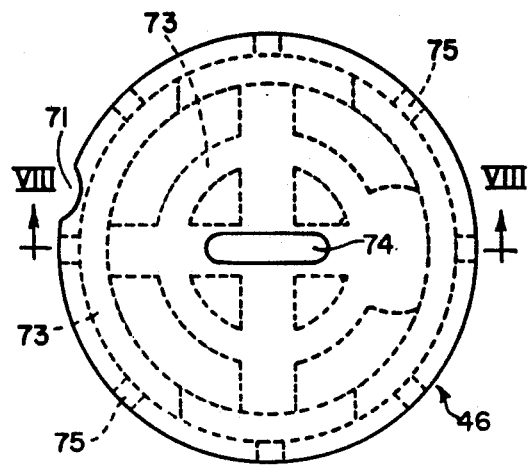
FIG. 6 is a plan view of the bell that makes up part of the safety lockout device illustrated in FIG. 3.
Figure 8:
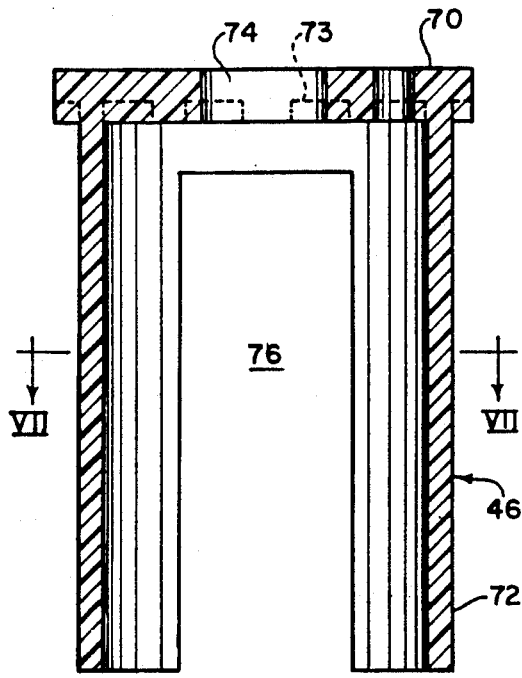
FIG. 8 is a sectional view taken on lines 8—8 of FIG. 6.
Figure 7:
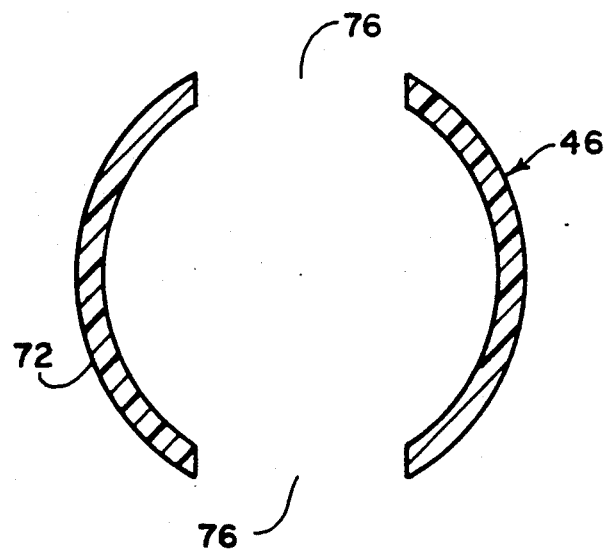
FIG. 7 is a sectional view taken on lines 7—7 of FIG. 8.

FIGS. 6–8 show more fully the details of the bell 46. It is made up of a one piece construction out of a high strength plastic alloy in the general form of the cylinder having an upper cylindrical sub cover member 70 and a lower member 72. As shown in FIG. 3A, the member 70 is dimensioned both as to its diameter and thickness to fit inside of the bottom of the ring 24 so as to completely cover the opening 25 of the valve box 16 and to allow sufficient space above it to accommodate the cover 27. At the center of the member 70, a slot 74 is provided sufficient in size to allow the easy passage of the eye 63 while preventing access to the bracket so long as the bell is not removed, and given the fact that the padlock 48 is larger than the slot 72, it will prevent removal of the bell 46. The cooperation of the member 70 with the bracket 42 will also keep the bracket in its proper operable orientation.

The member 70 has a notch 71, shown in FIG. 6, and several reinforcing horizontal ribs 73, one being indicated at 73 in FIG. 8, the notch being sized to accommodate the bolt that secures the cover plate to the ring. As noted in FIG. 3A, the padlock 48, that may be of several well known types and sizes, is accommodated by the diameter and height of the space 64 left between the bell 46 and cover 27. The padlock shown is intended to be operated by a key, not shown. As shown only in FIG. 3A, to the upper surface of the cover member 70 a thin indicia disc 75 is placed loosely on top of the member, being of substantially the same diameter and having a slot similar to the slot 74. The disc when installed will be held in the desired position by the padlock 48, as best shown in FIG. 3B. The upper surface of the disc may 75 be brightly painted or otherwise covered to call attention to the fact that the valve 10 is locked out such as by the wording "DANGER—DO NOT OPERATE" and may have other indicia to alert workman of the lockout condition of the valve and that the valve in question is a gas valve. Such indicia is indicated at the upper surface of disc 75 by reference numeral 77 in FIG. 3A.

The lower member 72 of the bell 46 has a length, as noted above, greater than the opening 25 of the valve box 16 so that the bell can not inadvertently fall into the opening 25 and block the opening when there is no need for the safety lockout dvice. FIGS. 6–8 show that the member 72 is provided with two opposed slots 76 having a width, as one views FIG. 8, sufficient to pass over the width of the tabs 62 when the bell is installed after the bracket has been installed. The slots 76 are made long enough to allow the lower outer surface of the cover member 70 to contact the inside adjacent surface of the ring 24, as shown in FIG. 3A, and yet provide that the upper ends of the slots extend above the tabs 62. Accordingly, the cover member 70 and the slots 76 of the lower member 72 are designed so that the contact point of the tapered inner surface of the ring 24 will allow the slots to fall above the tabs when the bracket and bell are assembled. The member 72 has a number of axially extending ribs, which are indicated by reference 75 in FIG. 6.

Figure 9:
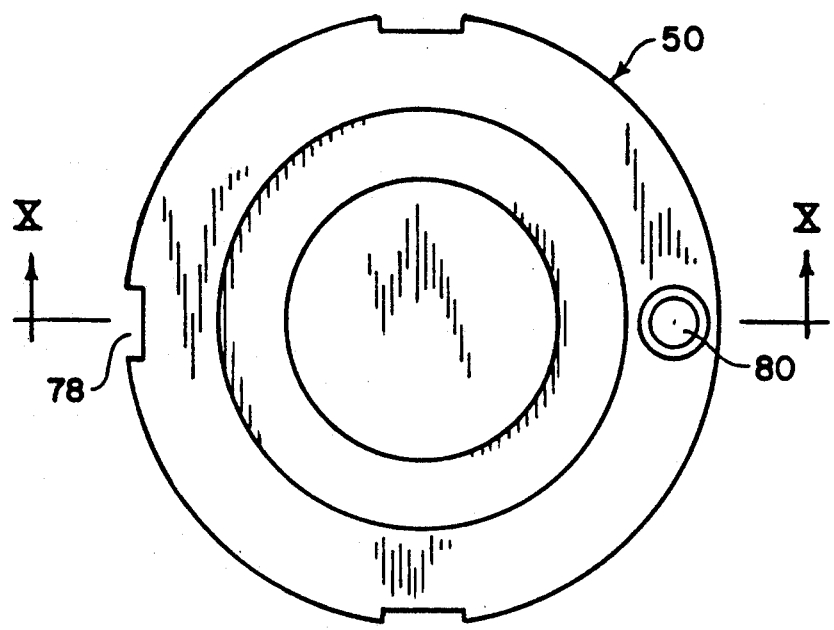
FIG. 9 is a plan view of a different embodiment of a cover plate that can be used with a modified valve box when employing the safety lockout device.
Figure 10:
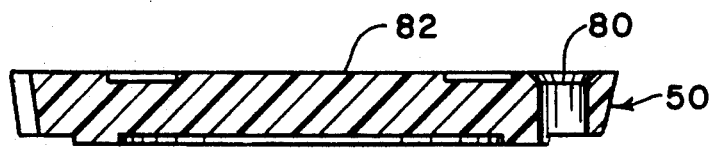
FIG. 10 is a sectional view taken on lines 10—10 of FIG. 9.

FIGS. 9 and 10 show a substituted cover 79 for the cover 27 that may be employed with the safety lockout device when supplied not as a retrofit but as original equipment. This cover is intended to be substituted for the cast iron cover provided with the valve box 16. As such, the cover 79 is made to conform generally in features and dimensions to the standard cover having the usual lug recesses 78 into which are received lugs, not shown, provided in the upper inside surface of a ring, not shown in FIGS. 9 and 10, and a bolt opening 80, opposite one of the recesses 78, as best shown in FIG. 9. The cover 79 is made out of the same material as the bell 46. To add to the safety feature of the lockout device of the present invention, the upper surface 82 of the cover 79 may be brightly painted or otherwise covered to call attention to the fact that the valve 10 is "locked out" and may have other indicia to alert workman of the lockout condition of the valve and that the valve in question is a gas valve.

In briefly explaining the use of the preferred form of the disclosed safety lockout device, a workman will remove the standard cover 27 of the valve box 16 of the valve 10 so that the valve may be closed in order to perform work on the piping network upstream of the valve. This cover will be placed in a safe place for reinsertion after the lockout device has been installed. After the standard cover is removed, and the valve closed, a workman by using only one hand will grip the bracket 42, with the eyebolt 44 secured thereto and collapse the legs 54 to allow the tabs 62 to pass into the opening 25 of the valve box 16 until the tabs are below the edge 34 of the ring 24. He then will release the hand pressure allowing the legs 54 to expand and place the tabs 62 under the edge 34 of the ring 24. If necessary, the workman will lift up on the eyebolt 44 to bring the tabs 62 into contact with the edge 34, thereby locking the bracket in its inserted position and preventing its upward movement and hence removal.

Once the bracket 42 is so positioned, the bell 46 may be installed over the bracket, whereby the outer surface of its cover member 70 will contact the adjacent inner tapered surface of the ring 24 and the slots 76 of the bell will pass over the tabs 62, to the position shown in FIG. 3A. In this position, access to the valve 10 is blocked by the cover member 70. In installing the bell 42, the slot 74 of its cover member 70 will pass over the eye 63 of the eyebolt 44 to allow the padlock 48 to be employed to lock the bracket 42 to the bell 46, in which the padlock being larger in size than the slot 74 will prevent removal of the bell, as the tabs at the same time will restrict upward movement of the padlock. Before the padlock 48 is inserted, the disc 73 will be placed over the cover member 70 with its indicia surface on top, its removal being prevented by the padlock 48.

With the padlock 48 in place, the cover 27 may be secured to the ring 24 by the use of the same bolt originally used to secure the cover to the ring. Once the need for the safety provided by lockout device is over, the safety lockout device may be removed for subsequent use, just as quickly and simply as described in its installation and the piping network put back in service.

Although the invention has been shown in connection with certain specific embodiments, it will be readily apparent to those skilled in the art that various changes in parameters can be made to suit requirements without departing from the spirit and scope of the invention. For example, as noted above it will be appreciated that the safety lockout device may be used both as a retrofit, and as part of the originally supplied valve system and for other fluids than natural gas, for example water.

We claim:

1. A safety lockout device to prevent access to a subsurface shut-off device through a conduit formed by a valve box or a curb service box, said lockout device comprising:

cover means arranged and of a size to be received in the opening of such conduit so as to block access to such shut-off device, interconnecting means having an inner end and an outer end, said inner end including a platform means having an axial length greater than the transverse dimension of the interior area of such conduit for extending along such conduit into a selectively securable engagement with the interior of such conduit without support by said cover means, said outer end extending through an opening in said cover means and having an attachment means outward of said cover means, locking means releasably secured to said attachment means for interlocking said cover and said platform means, and the relationship of said cover means, said interconnecting means, and said locking means being such that said locking means will lock said interconnecting means to the cover means and prevent the removal of the secured condition of the interconnecting means with such conduit so long as said locking means is in its secured condition with said attachment means.

2. A safety lockout device for use with a shut-off device accessible through a hollow interior area extending throughout the axial length of a valve box, said lockout device comprising:

anchor means having platform and ledge second portions, said platform portion being dimensioned for insertion into such interior area extending into and being slightly smaller than the opening of such valve box, said ledge portion having an engagable surface sufficient in area when engaged to resist movement of said anchor means in the direction of the outer surface of such valve box, said platform portion being movable relative to such hollow interior area of such valve box, whereby said engagable surface may be moved towards and away from the axis of such interior area and caused to assume a first position within the transverse dimension of such interior area of such valve box to enable insertion of said ledge portion into such interior area, and a second position to place said engagable surface in a position to effect said engagement, attachment means secured at its inner end to said platform portion and arranged to extend from said platform portion to a position adjacent to but below the outer surface of such valve box and having at its outer end a lockable member, cover means arranged and being dimensioned to block access to said anchor means from the outer end of such valve box said cover means having an opening arranged and dimensioned sized to allow said lockable member to pass therethrough, an extending member carried by and extending away from said cover means into such interior area of such valve box and having an axial length greater than the diameter of such interior area of such valve box, said extending member having means along its axial length formed to pass over said platform portion when said cover means is inserted in a locking position over the anchor means, and the cooperative relationship between said anchor means and cover means being such that with said ledge portion in its engaged condition, said cover means in its locking position and said lockable member in a locked condition, said anchor means and cover means create a safety lockout for such valve.

3. A safety lockout device according to claim 2, wherein said platform portion has an axial length greater than the transverse dimension of such interior area.

4. A safety lockout device according to claim 2, wherein said cover means is dimensioned to fit into and below the outer most surface of the valve box, and dimensioned relative to such valve box to form a recess above said cover means in the outer most surface of such valve box, sufficient to allow a cover plate to be placed above the cover means in such interior area of such valve box, sufficient to allow a cover plate to be placed above the cover means and to allow said cover plate to be arranged substantially flush with the outer surface of such valve box, said cover plate dimensioned to fit into said recess and assume said flush relationship, and indicia means arranged on either the outer surface of said cover element or the outer surface of said cover plate giving notice of the presence of the safety lockout device in such valve box.

5. A safety lockout device for use with a valve in combination with a valve box having an outer surface and a circular valve access opening throughout its axial length, comprising:

bracket means having a generally U shaped cross section constituted by generally opposed legs, tabs and a bottom portion, said legs being separated by a dimension corresponding to the diameter of the opening of the valve box slightly smaller than the opening so as to be insertable in the opening below the outer surface of the valve box, a said tab being arranged on a different leg and opposite each other and extending generally perpendicularly and outwardly relative to the outer ends of an associated said leg, said tabs having engagable surfaces sufficient in area when engaged to resist movement of said bracket means in the direction of the outer surface of the valve box, said legs being compressible so as to be movable relative to the axis of the opening of the valve box, whereby said tabs may be urged towards and away from each other and caused to assume a collapsed position within the diameter of the opening of the valve box to enable insertion of said tabs, and an extended position where said tabs are separated by a distance greater than the diameter of the opening of the valve box to place said engagable surfaces in a position to effect said engagement, attachment means secured at its inner end to said bottom portion and arranged to extend from said bottom portion to a position adjacent to but below the outer surface of the valve box and having at its outer end a lockable member, bell means arranged and constructed to cooperate with said bracket means, said bell means having a cover element arranged and of a dimension to be received in the opening of the valve box so as to block access to said bracket means, said cover element having an opening arranged and dimensioned to allow said lockable member to pass therethrough, a tubular member carried by and extending away from said cover element into the opening of the valve box and having an axial length greater than the diameter of the opening of the valve box, said tubular member having slots along its axial length formed to pass over said tabs of said bracket means when the bell means is inserted in a locking position over the bracket means, and the cooperative relationship between said bracket means and bell means being such that with said tabs in their engaged condition, said bell means in its locking position and said lockable member in a locked condition, said bracket means and bell means create a safety lockout for the valve.

6. A safety lockout device according to claim 5, wherein said cover element is dimensioned to fit into and below the outer most surface of the opening of the valve box, and dimensioned relative to the valve box to form a recess above said cover element in the opening of the valve box, sufficient to allow a cover plate to be placed above the cover element and to be arranged substantially flush with the outer most surface of the valve box, said cover plate dimensioned to fit into said recess and assume said flush relationship, and indicia means arranged on either the outer surface of said cover element or the outer surface of said cover plate giving notice of the presence of the safety lockout device in the valve box.

7. A safety lockout device according to claim 5, wherein said tabs are arranged at the end of said bracket means most adjacent the outer surface of the valve box.

8. A safety lockout device according to claim 5, wherein said bracket means is made out of a spring steel.

9. The combination of a valve system and a safety lockout device, said valve system comprising:

a valve and a valve box arranged remote from said valve, means interposed between and interconnecting said valve and valve box, said valve box formed with a continuous circular opening allowing access to said valve and having an outer surface formed by said opening, said valve box also including a ring inward of said outer surface having an exposed surface, said safety lockout device comprising:

bracket means having a generally U shaped cross section constituted by generally parallel opposed legs, tabs and a bottom portion, said bracket means being in its dimension corresponding to the diameter of said opening of said valve box slightly smaller than said opening so as to be insertable in said opening below said outer surface of said valve box, a said tab being arranged on a different said leg opposite each other and extending generally perpendicularly and outwardly relative to the outer ends of a said associated leg, said tabs having engagable surfaces sufficient in area to engage said exposed surface of said ring thereby to resist movement of said bracket means in the direction of said outer surface, said legs having the characteristic of being compressible so as to be movable relative to the axis of said opening of said valve box, whereby said tabs may be urged towards and away from each other and caused to assume a collapsed position within the diameter of said opening of said valve box to enable insertion of said tabs, and an extended position towards said ring where said tabs are separated by a distance greater than the diameter of said opening of said valve box to place said engagable surfaces in a position to effect said engagement, attachment means secured at its inner end to said bottom portion and arranged to extend from said bottom portion to a position adjacent to but below the outer surface of said valve box and having at its outer end a lockable member, bell means arranged and constructed to cooperate with said bracket means, said bell means having a cover element arranged and of a dimension to be received in said opening of said valve box so as to block access to said bracket means, said cover element having an opening arranged and dimensioned to allow said lockable member to pass therethrough, a tubular member carried by and extending away from said cover element into said opening of said valve box and having an axial length greater than the diameter of said opening of said valve box, said tubular member having slots along its axial length formed to pass over said tabs of said bracket means when said bell means is inserted in a locking position over said bracket means, and the cooperative relationship between said bracket means and bell means being such that with said tabs in their engaged condition with said ring, said bell means in its locking position and said lockable member in a locked condition, said bracket means and bell means create a safety lockout for said valve.

10. The combination according to claim 9, wherein said cover element is dimensioned to fit into and below the opening of said valve box, and dimensioned relative to said valve box to form a recess above said cover element in said opening of said valve box, sufficient to allow a cover plate to be placed above the cover element and to be arranged substantially flush with said outer surface of said valve box, said cover plate dimensioned to fit into said recess and assume said flush relationship, and indicia means arranged on either the outer surface of said cover element or the outer surface of said cover plate giving notice of the presence of the safety lockout device in said valve box.

11. The combination according to claim 9, including a locking means, said locking means having means for contacting said attachment means in a manner to prevent removal of said bell means from said valve box as long as said contacting relationship is being effected.

12. A safety lockout device according to claim 9, wherein said tabs are arranged at the ends of said bracket means most adjacent the opening of said valve box.

13. A safety lockout device according to claim 9, wherein said bracket means is made out of a spring steel.

* * * * *